(12) United States Patent
Kim et al.

(10) Patent No.: US 9,491,438 B2
(45) Date of Patent: *Nov. 8, 2016

(54) METHOD AND APPARATUS FOR COMMUNICATING USING 3-DIMENSIONAL IMAGE DISPLAY

(71) Applicant: SAMSUNG ELECTRONICS CO., LTD., Suwon-si (KR)

(72) Inventors: Hark-joon Kim, Suwon-si (KR); Pil-seung Yang, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 213 days.

This patent is subject to a terminal disclaimer.

(21) Appl. No.: 13/764,531

(22) Filed: Feb. 11, 2013

(65) Prior Publication Data

US 2013/0155196 A1   Jun. 20, 2013

Related U.S. Application Data

(63) Continuation of application No. 12/264,579, filed on Nov. 4, 2008, now Pat. No. 8,395,615.

(30) Foreign Application Priority Data

Jul. 2, 2008   (KR) ......................... 10-2008-0063969

(51) Int. Cl.
*H04N 13/02* (2006.01)
*G01B 21/16* (2006.01)
(Continued)

(52) U.S. Cl.
CPC .......... *H04N 13/0203* (2013.01); *G01B 21/16* (2013.01); *G06F 3/017* (2013.01); *G06K 9/00335* (2013.01); *G06T 15/20* (2013.01); *H04N 13/04* (2013.01)

(58) Field of Classification Search
CPC ................. G06F 3/017; G06F 1/3231; G06F 2203/04808; G06F 3/011; G06K 9/00355; G06K 9/00335; H04N 13/0059; H04N 7/141; H04N 13/0203; H04N 13/04; H04N 7/15; H04N 21/4788; H04N 7/14; G06T 15/10; G06T 15/20; G01B 21/16
USPC ........................ 715/863, 757, 733, 753, 848; 348/E13.071, E7.083, 42, 51; 345/419; 382/154, 106, 190; 709/204
See application file for complete search history.

(56) References Cited

U.S. PATENT DOCUMENTS 6,580,556 B2   6/2003 Kakizawa
7,007,236 B2   2/2006 Dempski et al.
(Continued)

FOREIGN PATENT DOCUMENTS

KR   10-0346735 B1   11/2002

OTHER PUBLICATIONS

Communication dated May 20, 2014 issued by the Korean Intellectual Property Office in counterpart Korean Application No. 10-2008-0063969.
(Continued)

*Primary Examiner* — Carlos Perromat
(74) *Attorney, Agent, or Firm* — Sughrue Mion, PLLC (57) ABSTRACT

Provided is a communication method using a three-dimensional (3D) image display device. In the communication method, motion information is determined using a motion image obtained by photographing a user's motion indicating the user's request in relation to an opposite party, distance information indicating the distance between the user who is moving and the 3D image display device is determined, and then, the user's request is determined based on the motion information and the distance information.

9 Claims, 10 Drawing Sheets

(51) Int. Cl.
*G06F 3/01* (2006.01)
*G06K 9/00* (2006.01)
*G06T 15/20* (2011.01)
*H04N 13/04* (2006.01)

(56) References Cited

U.S. PATENT DOCUMENTS

| | | |
|---|---|---|
| 7,296,747 B2 | 11/2007 | Rohs |
| 7,425,069 B2 | 9/2008 | Schwerdtner et al. |
| 7,467,380 B2 | 12/2008 | Kurlander et al. |
| 7,551,780 B2 | 6/2009 | Nudd et al. |
| 2004/0189720 A1 | 9/2004 | Wilson et al. |
| 2005/0206610 A1 | 9/2005 | Cordelli |
| 2007/0002130 A1 | 1/2007 | Hartkop |
| 2007/0274561 A1 | 11/2007 | Rhoads et al. |
| 2008/0059578 A1 | 3/2008 | Albertson et al. |
| 2009/0237490 A1 | 9/2009 | Nelson, Jr. |

OTHER PUBLICATIONS

Sang Tae Lee, "Implementation and Performance Analysis of Server/Client System for Web-based 3D Video Communication", Dec. 2004, 116 pgs total, KDMT1200532871.

Peterka et al.; Personal Varrier: Autostereoscopic virtual reality display for distributed scientific visualization; Future Generation Computer Systems 22; pp. 976-983; May 2006.

Barakonyi et al.; Cascading Hand and Eye Movement for Augmented Reality Videoconferencing; Proceedings 2nd IEEE Symposium on 3D User Interfaces; Mar. 2007.

Neo Z et al.; Hyperlink in Chat Room; EclipseZone; http://www.eclipsezone.com/eclipse/forums/t95282.html; dated Dec. 6, 2006; retrived Feb. 8, 2012.

Tam et al.; 3D-TV Content Generation: 2D-to-3D Conversion; 2006 IEEE International Conference on Multimedia and Expo; Jul. 2006.

Communication dated Apr. 14, 2015 issued by the Korean Intellectual Property Office in counterpart Korean Patent Application No. 10-2014-0192563.

Communication dated Oct. 28, 2015 issued by the Korean Intellectual Property Office in counterpart Korean Patent Application No. 10-2014-0192563.

METHOD AND APPARATUS FOR COMMUNICATING USING 3-DIMENSIONAL IMAGE DISPLAY

CROSS-REFERENCE TO RELATED PATENT APPLICATIONS

This application is a continuation of U.S. patent application Ser. No. 12/264,579, filed on Nov. 4, 2008, which claims priority from Korean Patent Application No. 10-2008-0063969, filed on Jul. 2, 2008, in the Korean Intellectual Property Office, the disclosures of which are hereby incorporated herein in their entirety by reference.

BACKGROUND OF THE INVENTION

1. Field of the Invention

Methods and apparatuses consistent with the present invention relate to communication using a display device, and more particularly, to reproduction of a three-dimensional (3D) image using a 3D image display device and communication performed using an image recognized three-dimensionally.

2. Description of the Related Art

Advancements in network technology enable communication between users of personal computers (PC) or wired/wireless home appliances via a messenger service or voice communication.

For example, in a conventional communication method, a user A who requests communication selects a function of adding a buddy from a menu, and designates a user B as a person to be communicated with by inputting the details of the user B or searching for the user B. Then, the user B receives information reporting the request from the user A and selects whether to accept or refuse the request. That is, in order to add a person to be communicated with, a multi-step process must be performed, in which a person who requests communication selects a menu, designates the person to be communicated with by inputting his or her details or by searching for him or her, and transmits the request to the person, and then, that person selects whether to accept or reject the request.

In order to transmit or receive content in a conventional communication method, a transmitter transmits the content by either dragging it to a predetermined location or by selecting functions of transmission and content selection from a menu. A receiver can accept to receive the content by using a function of notifying content receipt, and then receive the content by either selecting a location for storing the content with a function of selecting a storage location, or by dragging the content to a predetermined location with a cursor. In this case, the transmitter and receiver must also perform a multi-step menu selection process, and an input device must be used.

Accordingly, in order to perform a specific function according to a conventional communication method, a multi-step process must be performed, in which a first user designates a second user as a person to be communicated with by inputting the details of the second user or searching for the second user and proposes an event to the second user, and then, the second user accepts and performs the event. Also, an input device that has a complicated menu or can be used for communication is additionally necessary to carry out various functions.

SUMMARY OF THE INVENTION

The present invention provides a communication method and apparatus for performing various functions during communication, in response to a user's request determined by the user's motion and location, without an additional input device or having to perform a multi-step menu selection process.

According to an aspect of the present invention, there is provided a communication method using a 3D (three-dimensional) image display device, the method comprising determining motion information by using a motion image obtained by photographing a user's motion indicating the user's request in relation to an opposite party; determining distance information indicating a distance between the user who is moving and the 3D image display device; and determining the user's request based on the motion information and the distance information.

The method may further include receiving image information of the opposite party, and reconstructing a 3D image from the image information.

If the image information is 2D (two-dimensional) information, the reconstructing of the 3D image may include transforming the 2D image information into 3D image information.

The determining of the motion information may include determining information regarding at least one of location and form of the motion represented in the motion image.

The determining of the user's request may include determining the user's request corresponding to predetermined motion information and distance information, based on a database storing users' requests that match various motion and distance information.

The method may further include if it is determined based on the motion information and the distance information that the user's request instructs that content be received from the opposite party, receiving information regarding the content; and receiving the content by using the information regarding the content.

The receiving of the content may include if the information regarding the content is identification information of the content, obtaining location information including at least one of information regarding a location storing the content and link information of the location, based on the identification information; and receiving the content by using the location information.

The identification information may include at least one of image tag information and electronic tag information, which represent the content.

If the information regarding the content is location information including at least one of information regarding a location storing the content and link information of the location, the receiving of the content may include receiving the content by using the location information.

If the content is received as the information regarding the content, the receiving of the content may include receiving the content.

The method may further include receiving identification information of content; and transmitting information regarding the content based on the identification information.

The transmitting of the information regarding the content may include transmitting the information regarding the content when it is determined based on predetermined motion information and distance information that the user's request instructs that the content be transmitted to the opposite party.

The identification information may include at least one of image tag information and electronic tag information of the content.

The transmitting of the information regarding the content may include transmitting the content based on the identification information.

The transmitting of the information regarding the content may include transmitting the identification information as the information regarding the content.

The transmitting of the information regarding the content may include obtaining location information including at least one of information regarding a location storing the content and link information of the location, based on the identification information; and transmitting the location information as the information regarding the content.

The method may further include receiving image information of the user and transmitting the image information to the opposite party.

According to another aspect of the present invention, there is provided a communication method using a 3D (three-dimensional) image display device, the method including receiving image information of a user and delivering the image information to an opposite party; and delivering to the opposite party a request for communication to be established using the 3D image display device.

According to another aspect of the present invention, there is provided a communication apparatus using a 3D (three-dimensional) image display device, the apparatus including a motion information determination unit determining motion information by using a motion image obtained by photographing a user's motion indicating the user's request in relation to an opposite party; a distance information determination unit determining distance information indicating a distance between the user who is moving and the 3D image display device; and a user request determination unit determining the user's request based on the motion information and the distance information.

The apparatus may further include a 3D image reconstructing unit reconstructing a 3D image by using received image information of the opposite party.

If the image information of the opposite party is 2D (two-dimensional) image information, the 3D image reconstructing unit may transform the 2D image information into 3D image information and reconstruct the 3D image from the 3D image information.

The motion information determination unit may determine information regarding at least one of the location and form of a predetermined motion represented in the motion image.

The user request determination unit may determine the user's request corresponding to predetermined motion information and predetermined distance information, based on a database storing users' requests that match various motion and distance information.

The apparatus may further include if it is determined based on the motion information and the distance information that the user's request instructs that content be received from the opposite party, a content information receiving unit receiving information regarding the content; and a content receiving unit receiving the content by using the information regarding the content.

If the information regarding the content is identification information of the content, the content receiving unit may obtain location information including at least one of information regarding the location storing the content and link information regarding the location, based on the identification information, and receive the content by using the location information.

The identification information may include at least one of image tag information and electronic tag information indicating the content.

If the information regarding the content is location information including at least one of information regarding the location storing the content and link information regarding the location, the content receiving unit may receive the content by using the location information.

If the content is received as the information regarding the content, the content receiving unit may receive the content.

The apparatus may further include a content identification information receiving unit receiving identification information regarding content from the display device; and a content information transmitting unit transmitting information regarding the content.

If it is determined based on predetermined motion information and distance information that the user's request instructs that the content be transmitted to the opposite party, the content information transmitting unit may transmit the information regarding the content.

The identification information may comprise at least one of image tag information of the content photographed with a camera and electronic tag information sensed by an electronic tag reader included in the display device.

The content information transmitting unit may transmit the content based on the identification information.

The content information transmitting unit may transmit the identification information as the information regarding the content.

The content information transmitting unit may obtain location information including at least one of information regarding a location storing the content and link information regarding the location, based on the identification information, and transmit the location information as the information regarding the content.

The apparatus may further include a user image transmitting unit receiving image information of the user and transmitting the image information to the opposite party.

The apparatus may further include a 3D image display unit reproducing a 3D image; a camera photographing the user; and an access sensor sensing the distance between the 3D image display unit and the user.

The apparatus may further include a content tag reader obtaining identification information of the content by reading an electronic tag of the content.

According to another aspect of the present invention, there is provided a communication apparatus using a 3D (three-dimensional) image display device, the apparatus including a user image transmitting unit receiving image information of a user photographed by a camera included in the display device, and delivering the image information to an opposite party; and a 3D communication request unit transmitting a request for communication to be established using a 3D image display device.

The apparatus may further include a 3D image display unit reproducing a 3D image; the camera photographing the user; and an access sensor sensing the distance between the 3D image display device and the user.

According to another aspect of the present invention, there is provided a computer readable medium having recorded thereon a program for executing a communication method using a 3D (three-dimensional) image display device, the method including determining motion information by using a motion image obtained by photographing a user's motion indicating the user's request in relation to an opposite party; determining distance information indicating the distance between the user who is moving and the 3D image display device; and determining the user's request based on the motion information and the distance information.

The method may further include reproducing a 3D image by using received image information of the opposite party.

The method further include if it is determined based on the motion information and the distance information that the user's request instructs that content be received from the opposite party, receiving information regarding the content; and receiving the content by using the information regarding the content.

The method may further include receiving identification information of content; and transmitting information regarding the content based on the identification information.

According to another aspect of the present invention, there is provided a computer readable medium having recorded thereon a program for executing a communication method using a 3D (three-dimensional) image display device, the method including receiving image information of a user and delivering the image information to an opposite party; and delivering to the opposite party a request for communication to be established using the 3D image display device.

BRIEF DESCRIPTION OF THE DRAWINGS

The above and other features and aspects of the present invention will become more apparent by describing in detail exemplary embodiments thereof with reference to the attached drawings in which.

DETAILED DESCRIPTION OF THE INVENTION

Exemplary embodiments of the present invention will now be described more fully with reference to the accompanying drawings, in which exemplary embodiments of the invention are shown.

Hereinafter, exemplary embodiments of a three-dimensional (3D) image display device and method according to the present invention will be described with reference to FIGS. 1 through 12.

Figure 1:
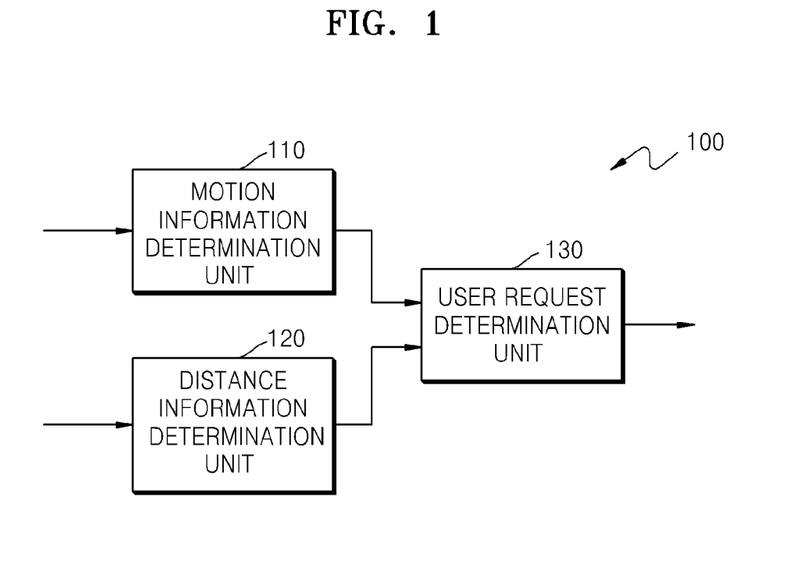
FIG. 1 is a block diagram of a communication apparatus using a 3-dimensional (3D) image display according to an embodiment of the present invention.

FIG. 1 is a block diagram of a communication apparatus 100 using a 3D image display according to an embodiment of the present invention. The communication apparatus 100 includes a motion information determination unit 110, a distance information determination unit 120, and a user request determination unit 130.

The motion information determination unit 110 determines motion information by using an image obtained by capturing, e.g., photographing, a user's motion indicating the user's request in relation to an opposite party, i.e., another party or another individual. The motion information is transmitted to the user request determination unit 130.

The motion information determination unit 110 can determine information regarding the motion, based on at least one of the location and form of the motion presented in the image.

The distance information determination unit 120 determines distance information representing the distance between the user who is moving and a 3D image display device (not shown). The distance information is transmitted to the user request determination unit 130.

The user request determination unit 130 determines the user's request based on the motion information and the distance information.

The user request determination unit 130 may determine the user's request corresponding to predetermined motion information and predetermined distance information, based on a database storing users' requests that match various motion and distance information.

Although not shown, the communication apparatus 100 may further include a content information receiving unit and a content receiving unit in order to receive content.

When it is determined based on the motion information and the distance information that the user's request requests that content be received from the opposite party, the content information receiving unit receives information regarding the content and transmits the information to the content receiving unit.

The content receiving unit receives the content by using the received information. If the received information is identification information, the content receiving unit must obtain location information of the content, based on the identification information. The content receiving unit can receive the content by using the location information. The location information may be one of information indicating the location where the content is stored and link information regarding the location. The identification information may be image tag information or electronic tag information for exhibiting the content.

The content receiving unit may receive the content by using the location information when it directly receives information regarding the content from the location indicated by the location information. The content may be received as information regarding the content.

Although not shown, the communication apparatus 100 may further include a content identification information receiving unit and a content information transmitting unit in order to deliver content.

The content identification information receiving unit receives the identification information from a display device (not shown) and outputs it to the content information transmitting unit.

If the user request determination unit determines that the user's request is requesting that content be transmitted to the opposite party, based on a predetermined motion image and predetermined distance information, then the content information transmitting unit can transmit information regarding the content.

The identification information may be image tag information of the content photographed with a camera, or electronic tag information read by an electronic tag reader included in a display device.

The content information transmitting unit transmits the information regarding the content based on the identification information. The content information transmitting unit may transmit the content, the identification information, or the location information as the information regarding the content.

Although not shown, the communication apparatus 100 may further include a content tag reading unit that obtains identification information of content by reading an electronic tag regarding the content.

Although not shown, the communication apparatus 100 may further include a user image transmitting unit that receives image information of a user from a camera and transmits it to the opposite party.

Figure 2:
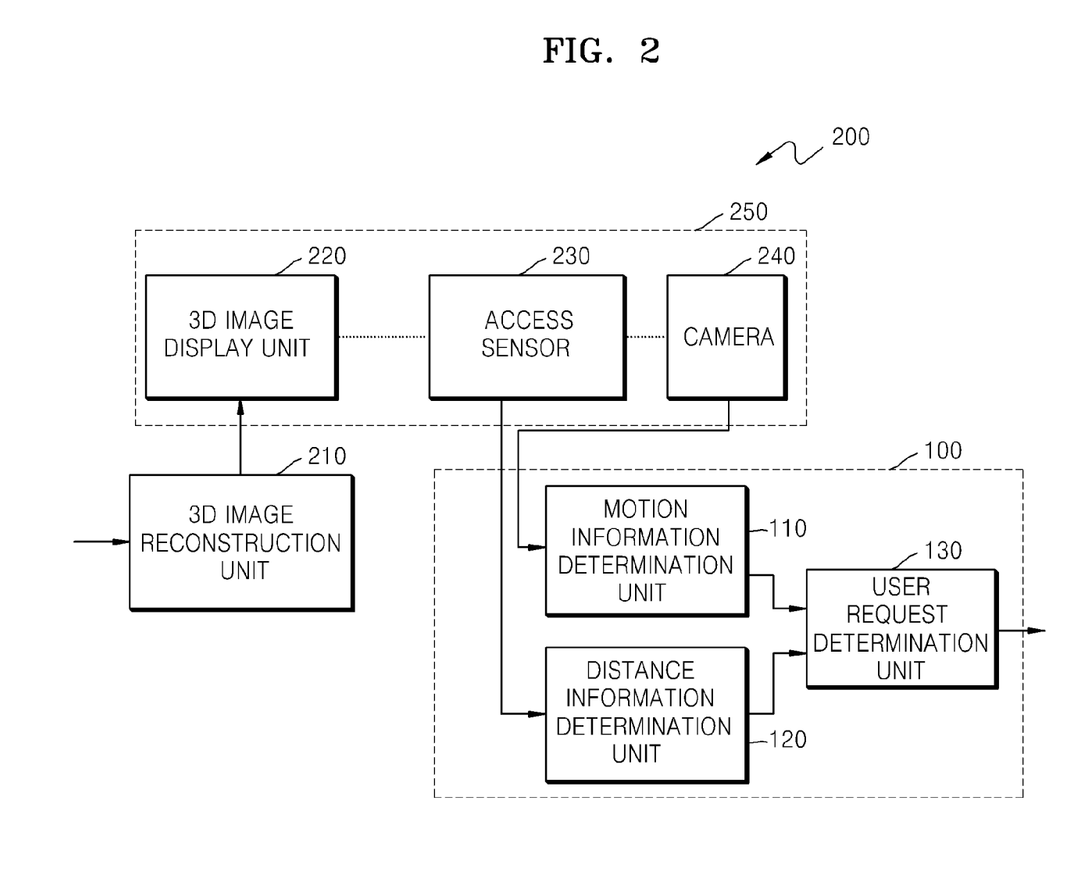
FIG. 2 is a block diagram of a communication apparatus using a 3D image display according to another embodiment of the present invention.

FIG. 2 is a block diagram of a communication apparatus 200 using a 3D image display according to another embodiment of the present invention. The communication apparatus 200 includes the communication apparatus 100 illustrated in FIG. 1, a 3D image reconstruction unit 210, and a user input/output unit 250. The user input/output unit 250 may include a 3D image display unit 220 that outputs information directly to a user, an access sensor 230 that inputs information directly from the user, and a camera 240.

The image reconstructing unit 210 reconstructs a 3D image by using the received image information of the opposite party. The reconstructed 3D image is output to the 3D image display unit 220.

If the image information is two-dimensional (2D) image information, the image reconstructing unit 210 can transform it into 3D image information and reconstruct a 3D image by using the 3D image information.

The access sensor 230 senses the distance between the 3D image display unit 220 and the user and outputs the resulting distance information to the distance information determination unit 120. The distance information determination unit 120 can detect the distance between the 3D image display unit 220 and the user based on the information regarding the distance sensed by the access sensor 230.

The camera 240 transmits image information of the user obtained by photographing the user to the motion information determination unit 110.

The user request determination unit 130 determines the user's request, based on motion information of the user, which is photographed by the camera 240 and determined by the motion information determination unit 110, and distance information sensed by the access sensor 230 and determined by the distance information determination unit 120.

Figure 3:
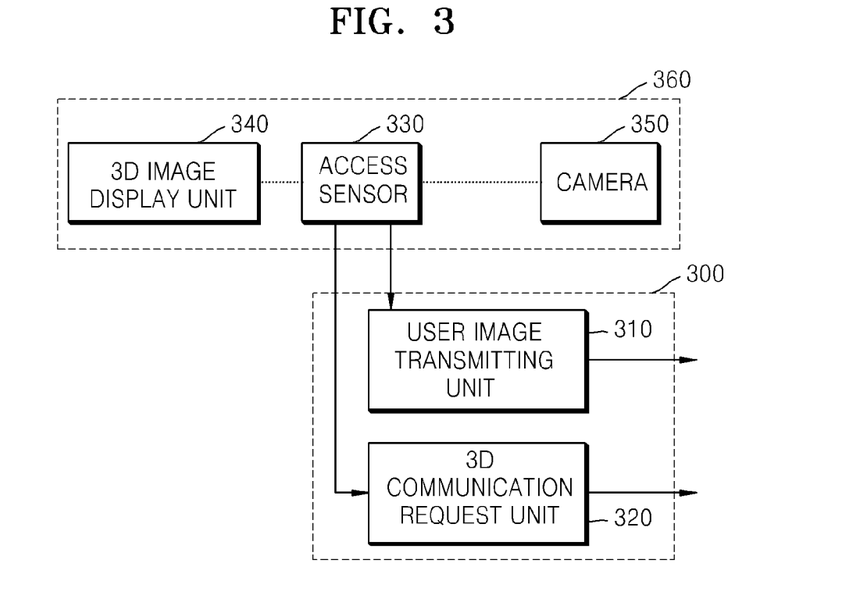
FIG. 3 is a block diagram of a communication apparatus using a 3D image display according to another embodiment of the present invention.

FIG. 3 is a block diagram of a communication apparatus 300 using a 3D image display according to another embodiment of the present invention. The communication apparatus 300 includes a user image transmitting unit 310 and a 3D communication request unit 320 in order to request the opposite party to establish communication with a user using a 3D image display. A user input/output unit 360 includes a camera 350, a 3D image display unit 340, and an access sensor 330. The communication apparatus 300 may have access to the user input/output unit 360.

Although not shown, another example of the communication apparatus 300 may include the user image transmitting unit 310, the 3D communication request unit 320, the camera 350, the 3D image display unit 340, and the access sensor 330.

The user image transmitting unit 310 receives image information of the user, which is photographed by the camera 350, and transmits it to the opposite party.

The 3D communication request unit 320 transmits information requesting communication to be established using a 3D image display.

Figure 4:
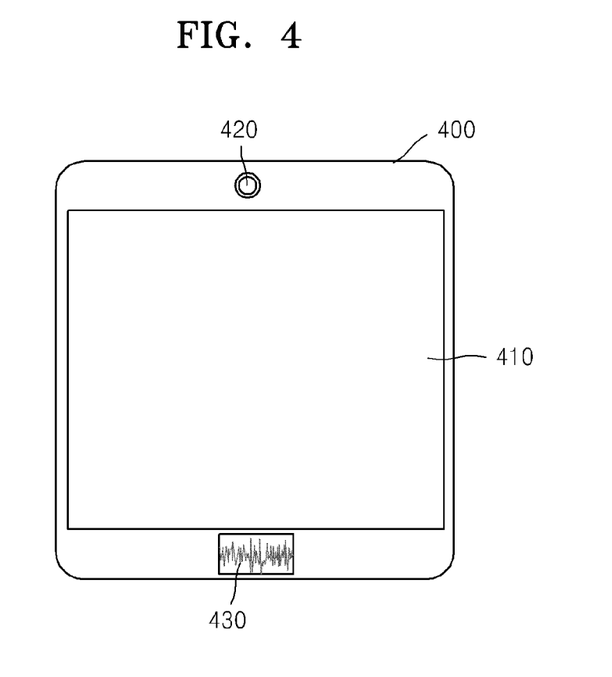
FIG. 4 is a view of a display device for operating a communication apparatus according to an embodiment of the present invention.

FIG. 4 is a view of a display device 400 for operating a communication apparatus according to an embodiment of the present invention. The display device 400 includes a 3D image display unit 410, a camera 420, and an access sensor 430. The display device 400 is just an example of a display device that can be employed by communication apparatuses according to embodiments of the present invention.

According to another embodiment of the present invention, the 3D image display unit 410, the camera 420, and the access sensor 430 may be distributed over a plurality of devices.

The camera 420 photographs a user. The access sensor 430 senses the distance between the user and the display device 400. A received image is reproduced in the 3D image display unit 410.

Figure 5:
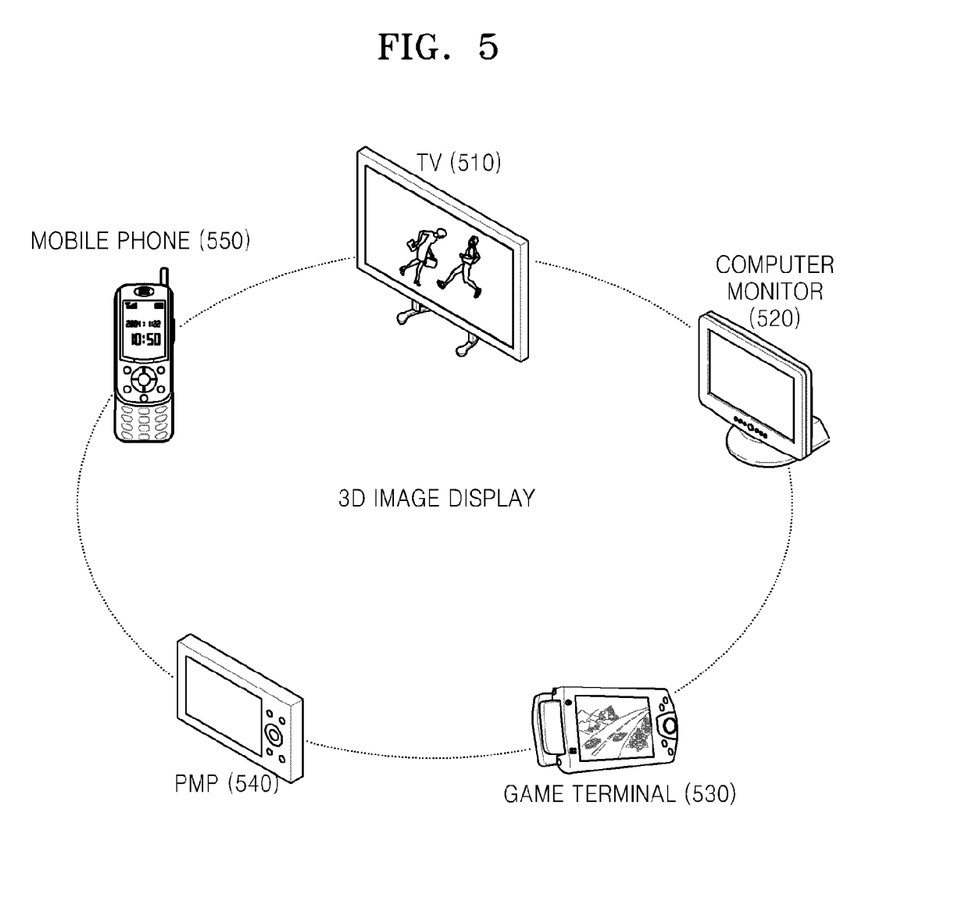
FIG. 5 illustrates various 3D image display devices that can be employed by a communication apparatus according to an embodiment of the present invention.

FIG. 5 illustrates various 3D image display devices that can be employed by a communication apparatus according to an embodiment of the present invention.

A communication apparatus according to an embodiment of the present invention can be applied to various display devices which are each capable of displaying a 3D image and including a camera capturing an image of a user and a sensor sensing the distance between the user and the display device.

Advancements in 3D image reproduction technology have enabled display devices capable of reproducing a 3D image to be applied to not only televisions (TVs) but also various other fields of display. Thus, the present invention can be applied to various display devices, such as a TV 510, a computer 520, a game terminal 530, a portable mobile player (PMP) 540, and a mobile phone 550, which have a display panel capable of reproducing a 3D image, a camera for photographing, and an access sensor.

Figure 6:
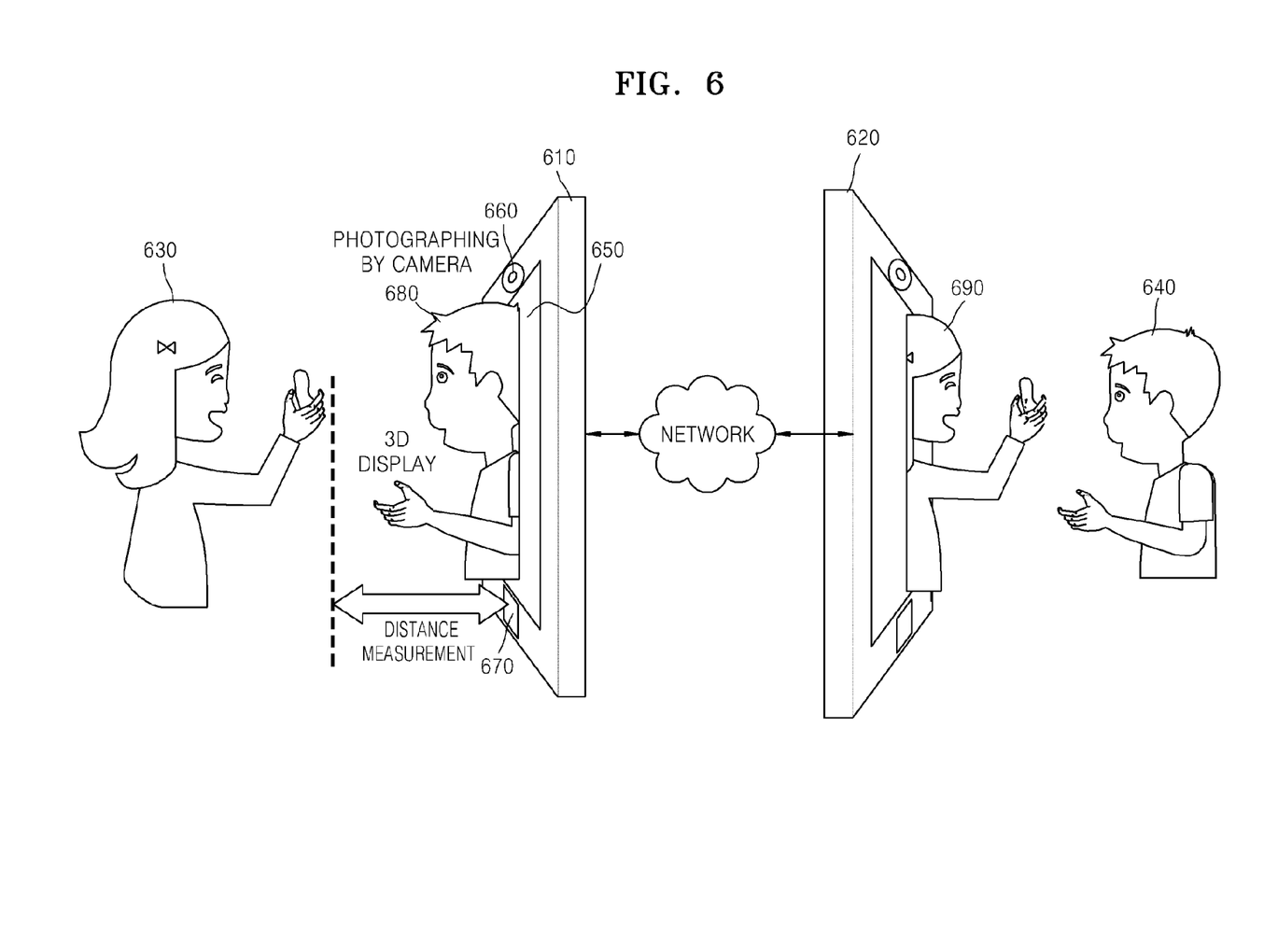
FIG. 6 illustrates communication between two people according to an embodiment of the present invention.
Figure 7:
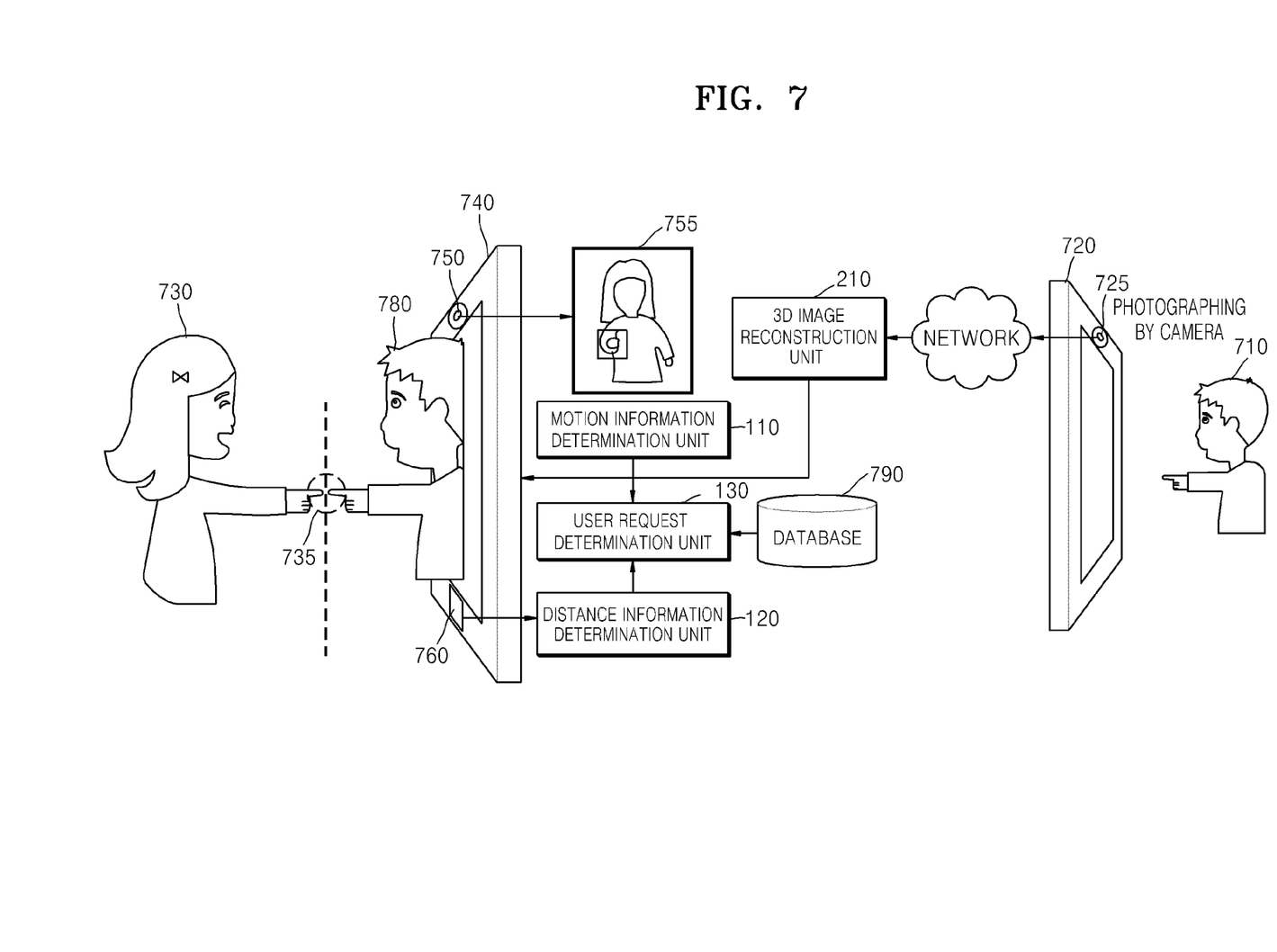
FIG. 7 illustrates an operation of a communication apparatus used to establish communication between two people according to an embodiment of the present invention.
Figure 8:
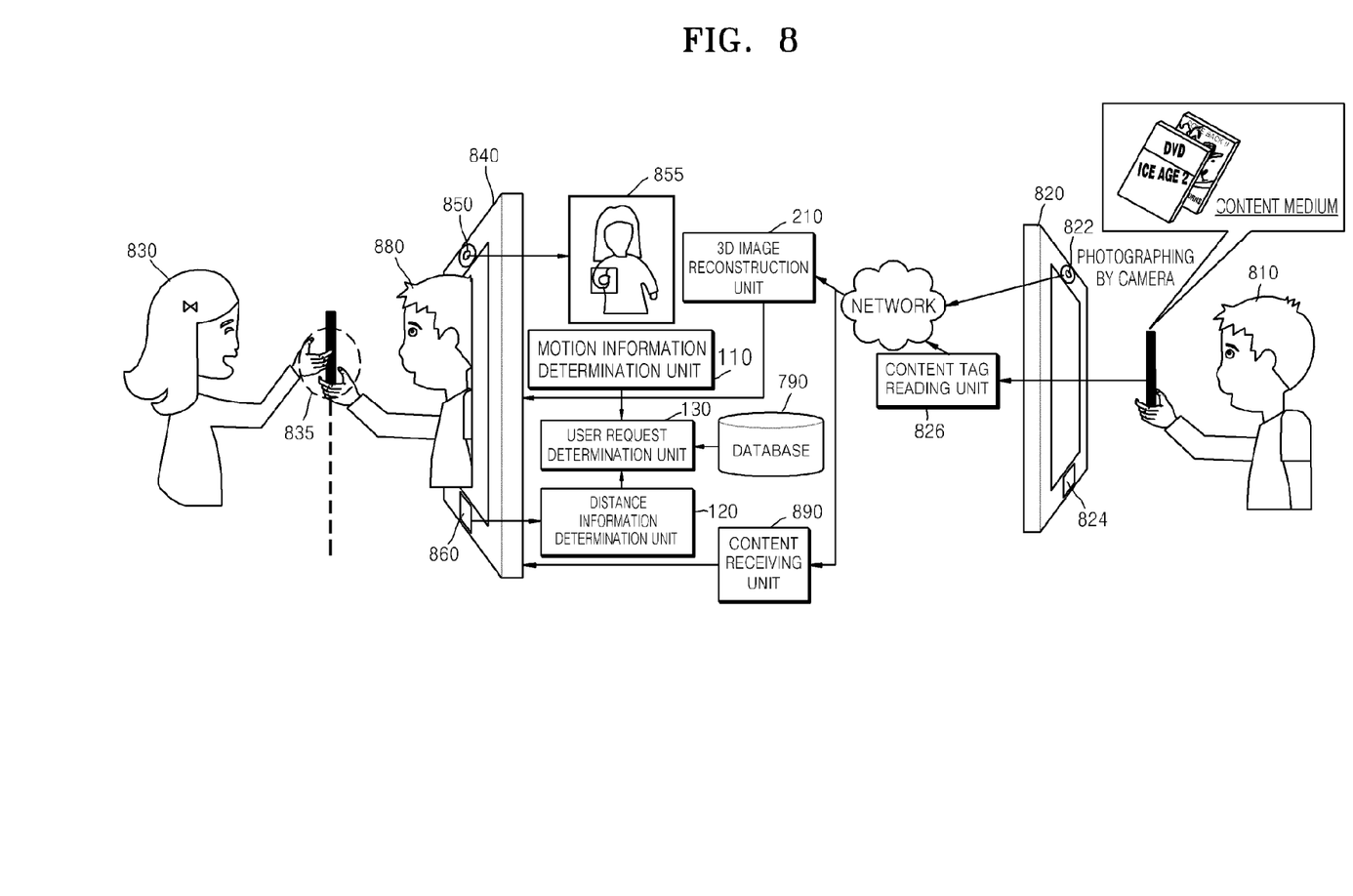
FIG. 8 illustrates an operation of a communication apparatus for transmitting content during communication between two people according to an embodiment of the present invention.

FIG. 6 illustrates communication between two people according to an embodiment of the present invention. Referring to FIG. 6, a communication apparatus according to an embodiment of the present invention is applied to communication between a first user 630 and a second user 640 who respectively use a first display device 610 and a second display 620. FIGS. 6 through 8 illustrate communications established between two people but the present invention is not limited thereto.

The first display device 610 includes a 3D image display unit 650, a camera 660, and an access sensor 670. The 3D image display device 650 reproduces an image of the second user 640 three-dimensionally so that the first user 630 can view a 3D image 680 of the second user 640. The camera 660 photographs the first user 630, and information regarding an image obtained by photographing the first user 630 is transmitted to the second user 640. The second display device 620 reproduces the image of the first user 630 three-dimensionally, based on the information regarding the image of the first user 630. Thus, the second user 640 can view a 3D image 690 of the first user 630, which is reproduced by the second display device 620.

The access sensor 670 can sense the distance between the first user 630 and the access sensor 670. In general, the distance sensed by the access sensor 670 can be used to measure the distance between the first display device 610 and the first user 630. If the access sensor 670 is attached to the first display device 610, it can be determined that the access sensor 670 and the first display device 610 are placed at the same location, and thus, the distance sensed by the access sensor 670 can be used in measuring the distance between the first display device 610 and the first user 630.

FIG. 7 illustrates an operation of a communication apparatus for establishing communication between two people according to an embodiment of the present invention. In the current embodiment, a first user 710 uses a first display device 720 and a second user 730 uses a second display device 740 in order to establish communication therebetween. The first display device 720 includes a 3D image display unit and a camera 725, and the second display device 740 includes a 3D image display unit, a camera 750, and an access sensor 760.

An image of the first user 710 photographed by the camera 725 is transmitted to the second user 730 via a network. A 3D image reconstruction unit 210 receives the image of the first user 710, reproduces it three-dimensionally, and outputs a 3D image 780 of the first user 710 to the 3D image display unit of the second display device 740. Then, the second display device 740 reproduces the 3D image 780.

If the second user 730 views the 3D image 780 of the first user 710 and makes a motion 735 corresponding to the 3D image 780, the motion 735 is photographed by the camera 750 and the distance between the motion 735 and the access sensor 760 is sensed by the access sensor 760. The distance sensed by the access sensor 760 at an initial stage or according to a user's selection may be set as the location of a specific body part or a motion of the second user 730, The motion information determination unit 110 determines motion information from a motion image 755 obtained by photographing the motion 735 of the second user 730 by the camera 750. The motion information determination unit 110 analyzes the location and motion 735 of a hand of the second user 730 based on the motion image 755. The distance information determination unit 120 determines distance information from the distance sensed by the access sensor 760.

The motion 735 of the second user 730 can be recognized three dimensionally by forming 3D information from a combination of the motion information which is 2D information and the distance information which is one-dimensional (1D) information. A request from the second user 730 related to the first user 710 can be exactly determined by detecting the position of the motion 735 of the second user 730 corresponding to the 3D image 780 of the first user 710 based on the distance of the second user 730 from the second display device 740.

The user request determination unit 130 determines the request indicated by the motion 735 of the second user 730 by using the motion information received from the motion information determination unit 110 and the distance information received from the distance information determination unit 120. The user request determination unit 130 determines the request matching the motion 735 of the second user 730 based on a database 790 storing users' requests that match various motion and distance information.

The database 790 stores users' various requests that match combinations of motion and distance information. The relationships between motion information/distance information and a user's request can be newly defined or determined. Thus, the relationships between motion information/distance information and a user's request that are stored in the database 790 can be edited by a user.

FIG. 7 illustrates an exemplary scenario to which communication according to the present invention is applied. In the scenario, the first user 710 requests communication with the second user 730 and the second user 730 determines whether to accept the request of the first user 710. If the user request determination unit 130 determines that the motion 735 of the second user 730 means accepting the request of the first user 710, communication may be established between the first user 710 and the second user 730.

FIG. 8 illustrates an operation of a communication apparatus for transmitting content during communication between two people according to an embodiment of the present invention.

In communication during which content can be received or transmitted according to an embodiment of the present invention, a first display device 820 further includes a content tag reading unit 826 that reads a content tag of a content medium provided from a first user 810 and obtains information regarding content. The content medium may display the content by using image information, e.g., a photo and a sign, or character information, e.g., a title, in order to identify the content.

A request for transmission of the content from the first user 810 may be determined by motion of the first user 810 photographed by a camera 822 and a distance sensed by an access sensor 824. For example, if the first user 810 makes a motion to present the content medium, the motion may be determined to be made to transmit the content.

Also, if a content tag is received rather than motion information or distance information, it may be determined to be a request for transmission of the content. The content tag reader 826 of the first display device 820 may read an electronic tag of the content or an image of the content medium photographed by the camera 822, as identification information of the content.

Information regarding the content to be transmitted from the first user 810 is delivered to a second user 830 via a network. The content, identification information of the content, or location information of the content may be delivered as information regarding the content.

A display unit of a second display device 840 of a second user 830 reproduces a 3D image 880 of the motion of the first user 810, which is made to show the content. If the second user 830 views the 3D image 880 of the first user 810 and makes a motion 835 corresponding to the 3D image 880, a motion image 855 is obtained by photographing the motion 835 by the camera 850, and the distance between the motion 835 and the access sensor 860 is sensed by the access sensor 860.

The motion information determination unit 110 determines motion information by analyzing the location and gesture of a hand of the second user 830 based on the motion image 855 of the second user 830. The distance information determination unit 120 determines distance information of the motion 835. The user request determination unit 130 determines the motion 85 of the second user 830 to indicate a request for receiving the content, based on a database 790.

The content receiving unit 890 receives the content by receiving information regarding the content. If the information regarding the content is the content itself, an additional process is not necessary but the information regarding the content may be identification information or location information of the content. If the information regarding the content is location information indicating either a location where the content is stored or a link to the location, the content can be received from the location. If the information regarding the content is identification information thereof, information regarding the location storing the content is obtained based on the identification information and the content is received from the location.

Figure 9:
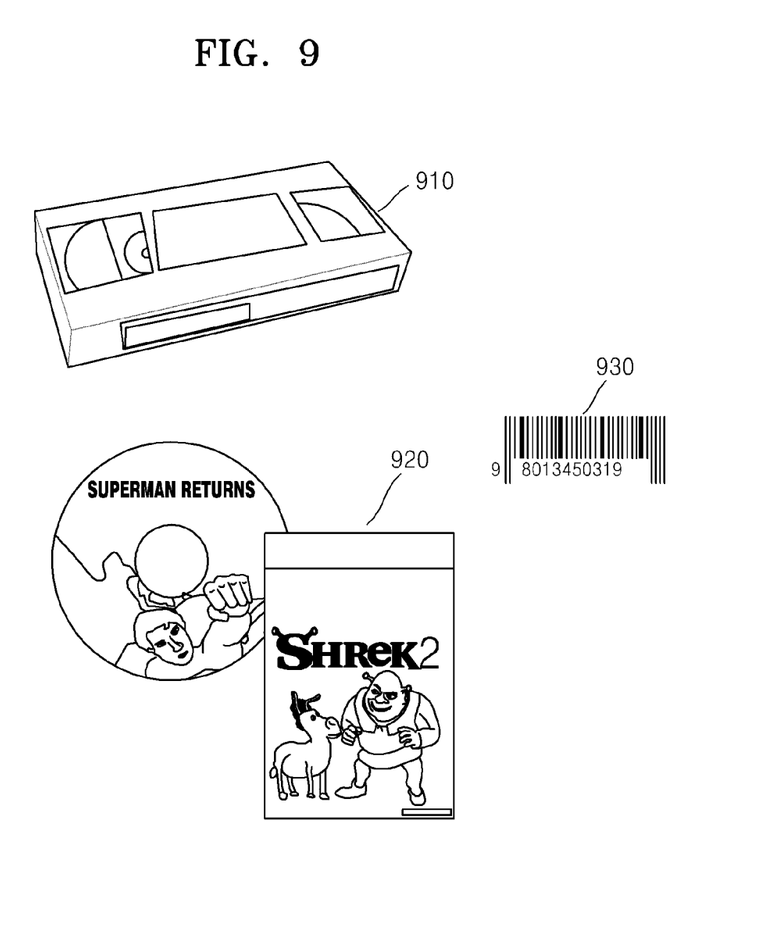
FIG. 9 is a view of a content tag according to an embodiment of the present invention.

FIG. 9 is a view of a content tag according to an embodiment of the present invention. According to the present invention, an image tag or an electronic tag may be used as a content tag. In order to transmit content recorded on a video tape 910, image information representing the content, which is painted on a sticker on the video tape 910, may be used as an image tag regarding the content. Also, an image 920 painted on a compact disc (CD), a digital versatile disc (DVD), or a packaging case may be used as an image tag regarding the content. When such an image tag is used, a display device (not shown) can sense the image tag via a camera even if it does not additionally include a content tag reader.

If an electronic tag, such as barcode 930, is used, the display device must additionally include an electronic tag reader.

Figure 10:
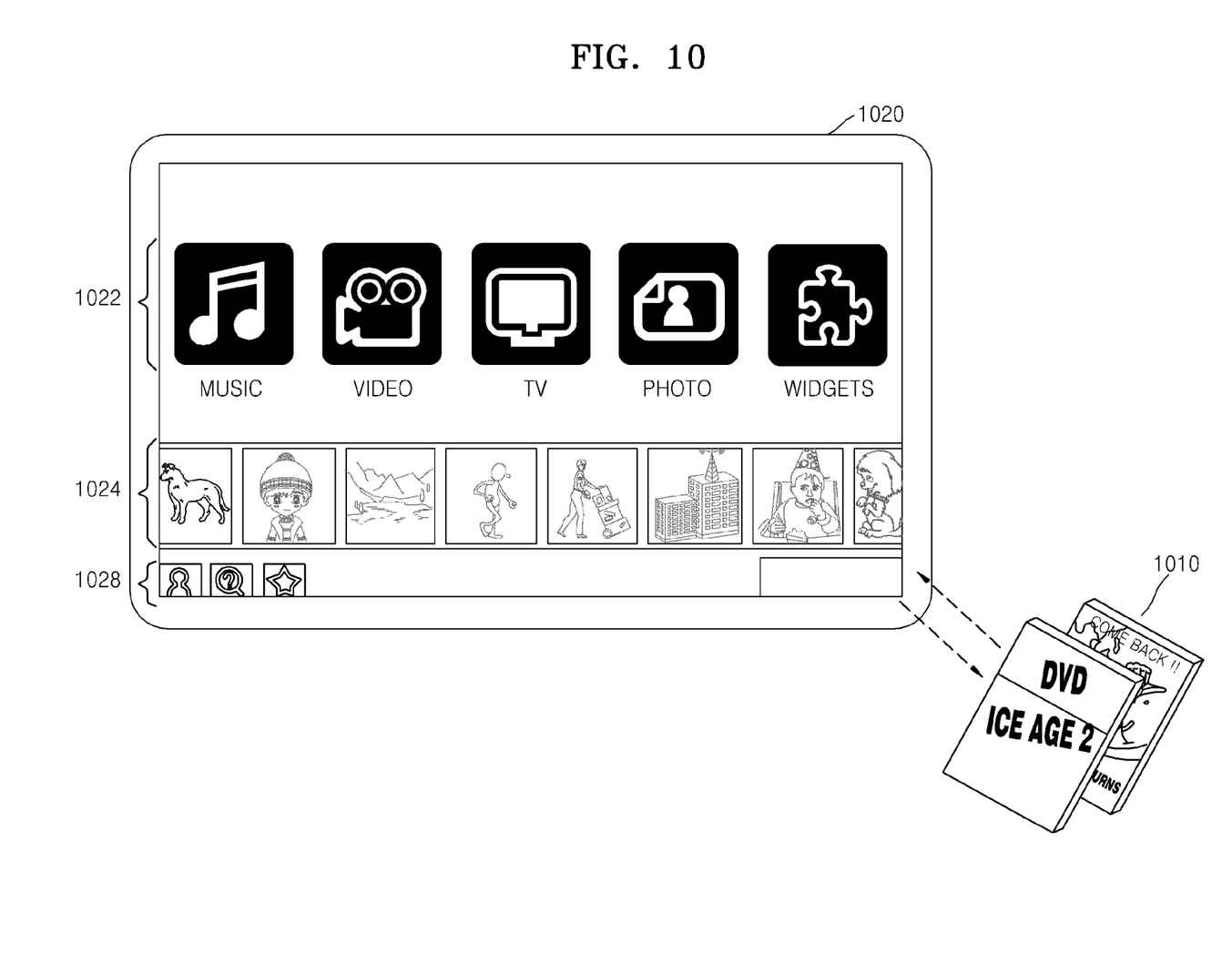
FIG. 10 is a view of a content tag according to another embodiment of the present invention.

FIG. 10 is a view of a content tag according to another embodiment of the present invention. That is, FIG. 10 illustrates a method of searching for content stored externally by using a tag according to an embodiment of the present invention. On a screen 1020, various content that can be provided from a server (not shown) are displayed. Referring to FIG. 10, types of content 1022, an example of a slideshow of content 1024, and various menus related to content 1028 are displayed on the screen 1020. A content transmitting unit can determine a link relationship between a tag 1010 and content, and a content receiving unit can check content indicated by the tag 1010.

Figure 11:
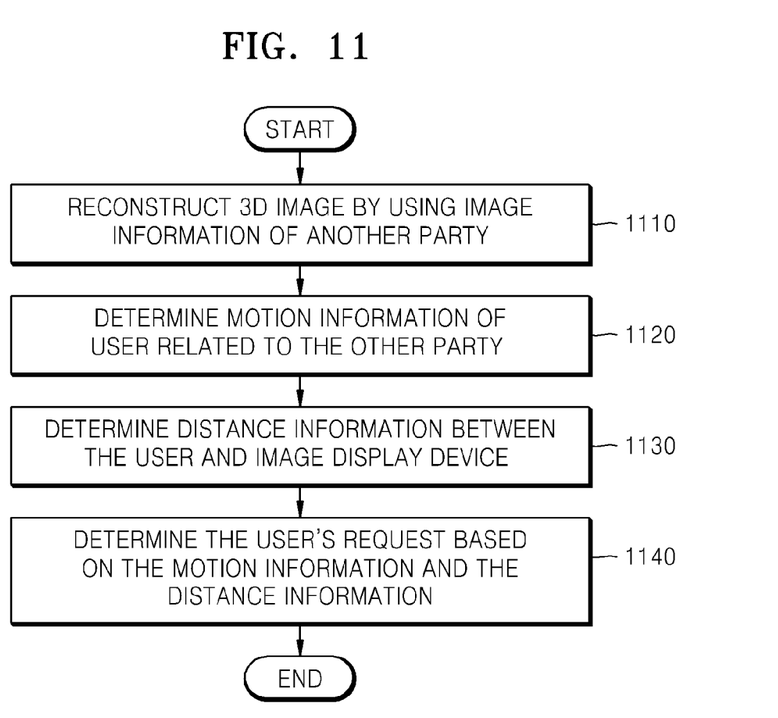
FIG. 11 is a flowchart illustrating a communication method using a 3D image display according to an embodiment of the present invention.

FIG. 11 is a flowchart illustrating a communication method using a 3D image display device according to an embodiment of the present invention.

In operation 1110, a 3D image is reconstructed using received image information of the opposite party. If the image information is 2D image information, a 3D image is reconstructed by transforming the 2D image information into 3D image information.

In operation 1120, motion information is determined using an image obtained by photographing a user's motion indicating the user's request related to the opposite party. The motion information may be determined using at least one of the location and the form of the motion of a user's predetermined body part, e.g., the user's hand.

In operation 1130, distance information indicating the distance between the user who is moving and the 3D image display device is determined. The distance sensed by a sensor is the distance between the sensor and a user but if the sensor is included in a display device, the distance between the display device and the user is considered as being equal to the distance between the sensor and the user. The sensor may sense the distance between the sensor and a user's predetermined body part, e.g., the user's hand.

In operation 1140, the user's request is determined based on the motion information and the distance information. Alternatively, the user's request may be determined based on a database storing users' requests that match motion and distance information.

Figure 12:
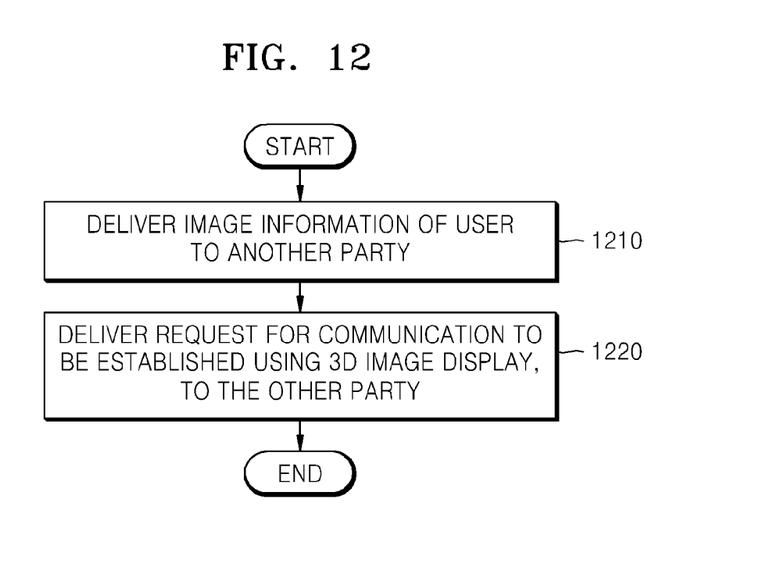
FIG. 12 is a flowchart illustrating a communication method using a 3D image display according to another embodiment of the present invention.

FIG. 12 is a flowchart illustrating a communication method using a 3D image display device according to another embodiment of the present invention.

In operation 1210, received image information of a user is delivered to the opposite party.

In operation 1220, information requesting communication to be established using a 3D image display is delivered to the opposite party. When a communication apparatus of the opposite party receives the information, an environment in which the communication can be established using a 3D image display device may be prepared.

The above embodiments of the present invention may be embodied as a computer program and performed in a general digital computer capable of executing the program via a computer readable recording medium. Examples of the computer readable recording medium include a magnetic recording medium (a ROM, a floppy disc, a hard disc, etc.), and an optical recording medium (a CD ROM, a DVD, etc.). In other exemplary embodiments, the computer readable recording medium may include even carrier waves (such as in transmission over the Internet).

In a communication method and apparatus according to an embodiment of the present invention, a user who receives a request for communication can check a person who requests the communication by viewing a 3D image of the person, thereby filtering unspecified peoples' requests for communication. Also, various functions can be performed using a combination of a user's motion and location during communication, without having to select a desired function by handling an additional input device or having to perform a multi-step menu selection process. Accordingly, various one-step communication functions can be performed.

While this invention has been particularly shown and described with reference to exemplary embodiments thereof, it will be understood by those of ordinary skill in the art that various changes in form and details may be made therein without departing from the spirit and scope of the invention as defined by the appended claims.

What is claimed is:

1. A communication method using a display device, the method comprising:
    displaying a three-dimensional image of another party communicating with a user operating the display device;
    determining distance information indicating a distance between the user who is moving and the three-dimensional image of the other party;
    determining motion information by using a motion image obtained by capturing a motion of the user indicating an interaction of the user with the other party; and
    determining the interaction of the user with the other party based on the motion information and the distance information between the user who is moving and the three-dimensional image of the other party.

2. The communication method using a display device according to claim 1, wherein the determining the interaction of the user to the other party matches the combination of the motion information and the distance information to stored request combinations.

3. The communication method using a display device according to claim 1, wherein the determining the interaction of the user to the other party may determine a first request for a first motion information and a first distance information and a second request for the first motion information and a second distance information.

4. A communication apparatus using a display device, the apparatus comprising:
   a memory comprising computer executable instructions;
   a processor configured to receive the computer executable instructions from the memory and execute the computer executable instructions, the computer executable instructions causing the processor to:
      display a three-dimensional image of another party communicating with a user operating the display device;
      determine distance information indicating a distance between the user who is moving and the three-dimensional image of the other party;
      determine motion information by using a motion image obtained by capturing a motion of the user indicating an interaction of the user with the other party; and
      determine the interaction of the user with the other party based on the motion information and the distance information between the user who is moving and the three-dimensional image of the other party.

5. The communication apparatus using a display device according to claim 4, wherein the processor determines the interaction of the user to the other party by matching the combination of the motion information and the distance information to stored request combinations.

6. The communication apparatus using a display device according to claim 4, wherein the processor determines a first request for a first motion information and a first distance information and a second request for the first motion information and a second distance information.

7. A non-transitory computer readable medium having recorded thereon a program for executing a communication method using a display device, the method comprising:
   displaying a three-dimensional image of another party communicating with a user operating the display device;
   determining distance information indicating a distance between the user who is moving and the three-dimensional image of the other party;
   determining motion information by using a motion image obtained by capturing a motion of the user indicating an interaction of the user with the other party; and
   determining the interaction of the user with the other party based on the motion information and the distance information between the user who is moving and the three-dimensional image of the other party.

8. A communication apparatus using a display device, the apparatus comprising:
   a memory comprising computer executable instructions;
   a processor configured to receive the computer executable instructions from the memory and execute the computer executable instructions, the computer executable instructions causing the processor to:
      display a three-dimensional image of another party communicating with a user operating the display device;
      determine a distance between the user and the three-dimensional image of the other party;
      determine motion information of the user using a motion image obtained by capturing a motion of the user; and
      determine an interaction of the user with the other party based on the motion information and the distance between the user and the three-dimensional image of the other party.

9. The communication apparatus of claim 8, wherein the processor determines the distance between a user and the three-dimensional image of the other party by measuring a distance between a sensor located on the display device and a predetermined body part of the user.

* * * * *